US010599934B1

(12) United States Patent
Lowe et al.

(10) Patent No.: US 10,599,934 B1
(45) Date of Patent: Mar. 24, 2020

(54) SPOOF DETECTION USING OPTOKINETIC RESPONSE

(71) Applicant: Alibaba Group Holding Limited, George Town (KY)

(72) Inventors: Jesse Lowe, Belton, MO (US); Christopher Lovelace, Hagerstown, MD (US); Reza R. Derakhshani, Shawnee, KS (US)

(73) Assignee: Alibaba Group Hoding Limited, George Town, Grand Cayman (KY)

( * ) Notice: Subject to any disclaimer, the term of this patent is extended or adjusted under 35 U.S.C. 154(b) by 0 days.

(21) Appl. No.: 16/361,078

(22) Filed: Mar. 21, 2019

(51) Int. Cl.
*H04N 9/47* (2006.01)
*G06K 9/00* (2006.01)
*G08B 13/196* (2006.01)
*G06T 7/246* (2017.01)
*G06K 9/62* (2006.01)

(52) U.S. Cl.
CPC ..... *G06K 9/00906* (2013.01); *G06K 9/00604* (2013.01); *G06K 9/6202* (2013.01); *G06T 7/248* (2017.01); *G08B 13/196* (2013.01); *G06T 2207/10016* (2013.01); *G06T 2207/30201* (2013.01)

(58) Field of Classification Search
CPC . A61B 5/117; G06K 9/00885; G06K 9/00899
USPC ........................................................ 382/117
See application file for complete search history.

(56) References Cited

U.S. PATENT DOCUMENTS

| 6,785,406 | B1* | 8/2004 | Kamada | G06K 9/00597 |
| | | | | 340/5.53 |
| 2013/0336547 | A1* | 12/2013 | Komogortsev | A61B 5/1171 |
| | | | | 382/117 |
| 2016/0019410 | A1* | 1/2016 | Komogortsev | A61B 5/1171 |
| | | | | 382/117 |
| 2017/0076145 | A1* | 3/2017 | Gottemukkula | G06K 9/00288 |
| 2017/0135577 | A1* | 5/2017 | Komogortsev | A61B 5/1103 |
| 2017/0156965 | A1* | 6/2017 | Geisinger | G16H 50/20 |
| 2017/0354369 | A1* | 12/2017 | Mills | A61B 3/113 |

(Continued)

OTHER PUBLICATIONS

Lee et al. (Towards Building a Remote Anti-spoofing Face Authentication System.In TENCON 2018-2018 IEEE Region 10 Conference Oct. 28, 2018 (pp. 0321-0326). IEEE.) (Year: 2018).*

(Continued)

*Primary Examiner* — Fabio S Lima
(74) *Attorney, Agent, or Firm* — Fish & Richardson P.C.

(57) ABSTRACT

The technology described in this document can be embodied in a method for preventing access to a secure system based on determining a captured video to be an alternative representation of a live person. The method includes presenting a stimulus on a user interface of a device. Video of a subject who is within a field of view of a video capture device is captured after presentation of the stimulus. The captured video is analyzed to extract ocular data comprising a response of the subject to the stimulus. A determination is made, by comparing the ocular data to one or more reference patterns that the subject in the captured video is an alternative representation of a live person. Responsive to determining that the subject in the captured video is an alternative representation of a live person, access to the secured system is prevented.

17 Claims, 7 Drawing Sheets

(56) References Cited

U.S. PATENT DOCUMENTS

2018/0232507 A1* 8/2018 Zizi ........................ G06F 21/32

OTHER PUBLICATIONS

Wikipedia.com [online], "Optokinetic Response," Last Updated on Nov. 23, 2018, [retrieved on May 13, 2019], retrieved from: URL<https://en.wikipedia.org/wiki/Optokinetic_response>, 2 pages.

* cited by examiner

SPOOF DETECTION USING OPTOKINETIC RESPONSE

TECHNICAL FIELD

This disclosure relates to image capture devices.

BACKGROUND

Biometrics allows a person to be identified and authenticated based on a set of recognizable and verifiable data, which are unique and specific to them. Biometric authentication includes the process of comparing data for a person's characteristics to that person's biometric "template" to determine resemblance. Biometric authentication systems can be grouped based on the physical characteristic employed to authenticate users. Examples of such systems include authentication based on fingerprints, hand geometry, palm veins, retina scans, iris scans, facial recognition, signatures, and voice analysis.

SUMMARY

In one aspect, this document features a method for preventing access to a secure system based on determining a captured video to be an alternative representation of a live person. The method includes presenting a stimulus on a user interface of a device. Video of a subject who is within a field of view of a video capture device is captured after presentation of the stimulus. The captured video is analyzed to extract ocular data comprising a response of the subject to the stimulus. A determination is made, by comparing the ocular data to one or more reference patterns that the subject in the captured video is an alternative representation of a live person. Responsive to determining that the subject in the captured video is an alternative representation of a live person, access to the secured system is prevented.

In another aspect, this document features a system that includes a video acquisition device and a video analysis engine that includes one or more processors. The video acquisition device is configured to capture a video of a subject who is within a field of view of a video capture device after presentation of a stimulus. The video analysis engine is configured to: analyze the captured video to extract ocular data comprising a response of the subject to the stimulus; determine, by comparing the ocular data to one or more reference patterns that the subject in the captured video is an alternative representation of a live person; and responsive to determining that the subject in the captured video is an alternative representation of a live person, prevent access to the secured system.

In another aspect, this document features one or more machine-readable storage devices that includes machine-readable instructions configured to cause one or more processing devices to execute various operations. The operations include: presenting a stimulus on a user interface of a device; capturing video of a subject who is within a field of view of a video capture device after presentation of the stimulus; analyzing the captured video to extract ocular data comprising a response of the subject to the stimulus; determining, by comparing the ocular data to one or more reference patterns that the subject in the captured video is an alternative representation of a live person; and responsive to determining that the subject in the captured video is an alternative representation of a live person, preventing access to the secured system.

Implementations of the above aspects can include one or more of the following features. A second video of a second subject can be captured after presentation of the stimulus. The second video can be analyzed to extract a second set of ocular data comprising a response of the second subject to the stimulus. A determination can be made, by comparing the second set of ocular data to the one or more reference patterns, that the second subject is a live person. Responsive to determining that the second subject is a live person, an authentication process can be initiated for determining if the live person is authorized to access the secured system. A type of stimulus to present can be selected from among multiple types of stimulus. A velocity at which to present the stimulus can be determined. Presenting the stimulus can include presenting the stimulus at the determined velocity. The stimulus can be a high contrast stimulus. Analyzing the captured video can include tracking eye movements after presentation of the stimulus. The reference patterns can include a first pattern corresponding to optokinetic nystagmus. Comparing the ocular data can include comparing the tracked eye movements to the first pattern corresponding to optokinetic nystagmus. Analyzing the captured video can include tracking changes in pupillary dynamics after presentation of the stimulus. The reference patterns can include a second pattern corresponding to an expected change in pupillary dynamics. Comparing the ocular data can include comparing the tracked changed in pupillary dynamics to the second pattern corresponding to the expected change in pupillary dynamics. Comparing the ocular data can include determining that the captured video is an alternative representation of a live person. Determining whether to grant access can include determining to not grant access, based on the captured video being an alternative representation of a live person. Comparing the ocular data can include determining that the captured video is of a live person. Determining whether to grant access can include determining to grant access, based on the captured video being of a live person.

Various implementations described herein may provide one or more of the following advantages. Reliability and/or security of a biometric authentication system can be improved by allowing the system to discriminate between live persons and alternative representations such as videos displayed on display devices. By allowing a biometric authentication system to discriminate between a video of a live person and a video of a spoof alternative representation, additional processing can be preemptively terminated, thereby creating an additional layer of security. In some cases, the technology described herein allows for implementing a spoof detection system while reducing requirements for additional hardware. This in turn in some cases, can reduce costs associated with the underlying biometric authentication system. The passive method of identification described herein can have a huge benefit over interactive methods due to transparency, ease of integration, and independence from user compliance.

Figure 1:
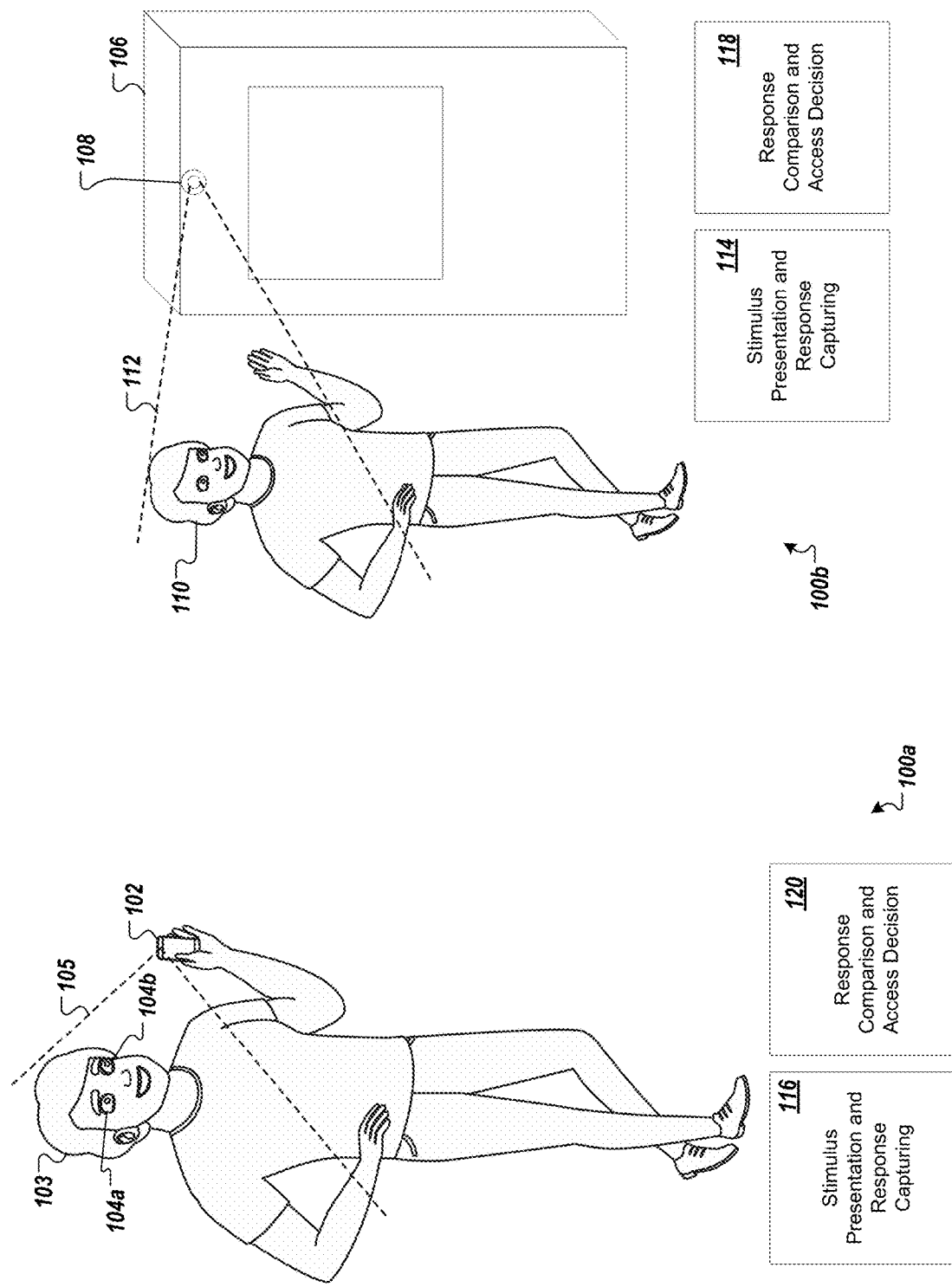
FIG. 1 illustrates example environments in which the technology described herein may be used.

Repeat use of reference characters in the present specification and drawings is intended to represent same or analogous features or elements.

DETAILED DESCRIPTION

This document presents a video analysis method in which video and/or images captured using an image acquisition device of a biometric authentication system are analyzed to determine if the video or images correspond to an actual live person, or to an alternative representation of the live person (e.g., a video recording of the live person). If the captured video or images are not determined to correspond to a live person, any further processing of the captured video or images by the biometric authentication system can be stopped, and any corresponding access attempt can be prevented immediately.

Many biometric authentication systems involve authenticating a user to a secure system based on recognizing the user's face, eye-print, iris etc. Such biometric authentication systems involve capturing one or more video or images of a user, and executing corresponding recognition processes on the captured image. Malicious attempts to breach the security of such biometric authentication systems can include presenting an alternative representation of a live person to gain access to an account or other privileges associated with the identity of the corresponding live person. Such attacks are generally known as spoof attacks, and the reliability/security of a biometric authentication system can be determined by the ability of the system to differentiate between a live person and corresponding alternative representations (also referred to as spoofs). The technology described herein improves security/reliability of biometric authentication systems that rely on recognizing a user based on face recognition, eye-print recognition, iris recognition etc. Specifically, this document describes preprocessing steps that allow for determining whether captured video or images correspond to an actual live person or a spoof alternative representation such as a video recording of the live person. Upon detecting that the captured video or images are a spoof, any further processing of the video or images to allow access to the corresponding secure system can be prevented, thereby adding an added layer of security to the system.

In the ubiquitous and inherently complex world of mobile device security, device manufacturers are engaged in constant efforts to fight theft, fraud, and address privacy concerns. With each new generation of devices, developers have introduced new sensors, methods, and features that can result in significant complications of design and cost. Despite the best efforts of highly qualified engineers, devices may suffer from faults that resourceful and determined bad actors may leverage to gain access to sensitive material. For instance, as described, a video recording of a live person may be used as a spoof of the live person.

Platform agnostic solutions can be developed that leverage the versatile array of sensors already present in most mobile devices. Significant innovations in image processing and machine learning have facilitated approaches of processing behavioral data collected from mobile devices. These innovations enable motion signatures to be extracted, with relative high accuracy, from front facing cameras on mobile devices. Front facing cameras are considered a standard accessory on most mobile devices, and in terms of biometric appeal these sensors have immense promise. Images and video can provide a wealth of data related to user identity and behavior and use thereof can be transparent to the user experience. During typical use of a mobile device, a user's face and some of the user's upper body can be seen in the field of view of the camera, adding the option to identify the user by facial and/or ocular morphological patterns.

One major issue associated with implementation of biometrics with behavioral features is a complication of user compliance, which can lead to significant reduction in usability and overall user experience. A desirable optimal biometric for mobile devices can be one that distinguishes among the largest possible population with a least invasive, least expensive, and highest accuracy methodology. Passive methods of identification can therefore have a huge benefit over interactive methods due to transparency, ease of integration, and independence from user compliance.

Ocular methods can be used to utilize unconscious pathway responses to prescribed stimulus to insure that biometric responses to the stimulus are originating at the time of the authorization request. Optokinetic nystagmus is a unique physiological response of the eye's motor system to specific patterns of moving visual information. As described herein, an optokinetic response can generally be consistent and characterizable and can therefore be used for biometric authentication, as a passive approach that does not rely on user compliance.

When viewing a static scene, most visual search activities consist of a brief dwell time, also referred to as gaze or fixation, which is then followed by a rapid (physiologically referred to as ballistic) motion which orients the central visual field to a new point of interest. Visual responses to dynamic environments generally differ significantly from responses to static scenes. For instance, with moving targets the visual system often prioritizes tracking over a detailed analytical approach. An optokinetic response to a moving target is a combination of involuntary slow-phase and fast-phase eye movements. For instance, an individual may follow, using a smooth pursuit, a moving object with their eyes, until the object moves out of the field of vision, at which point the eye moves back to the position it was in when it first saw the object (e.g., using an eye movement referred to as a saccade). Smooth pursuit movements can be characterized by relatively consistent velocities, with the center of the visual field passing through a large arc of the visual space. While saccades can be controlled (modulated) to some extent by high level processes, smooth pursuits are generally independent of conscious control. In fact, most individuals are not able to generate smooth pursuit movements without the presence of a moving target.

FIG. 1 illustrates example environments 100a and 100b in which the technology described herein may be used. The technology described herein may be used, for example, with various types of devices, such as a mobile device 102. The mobile device 102 can include, for example, a front-facing camera. A face of a user 103, including the user's eyes 104a and 104b, can be in a field of view 105 of the front-facing camera, while the user 103 is using the mobile device 102.

A kiosk 106 can be another example environment in which the technology described herein may be used. The kiosk 106 may be used for various purposes that require authenticating users via one or more biometric authentication processes. For example, the kiosk 106 can include an automated teller machine (ATM) that allows a user to withdraw money from a bank account. In general, the kiosk 106 may be deployed at various types of locations to authenticate users interactively, or even without any active participation of the user.

The kiosk 106 can include a camera 108 that is configured to capture videos and images of users interacting with the kiosk 106, such as a user 110, who is within a field of view 112 of the camera 108. The captured videos and images may be processed to identify/authenticate valid users, and/or permit or deny access to the services/products being offered through the kiosk 106. As described below, a captured video can be used to authenticate a user, based on an optokinetic response.

The user 110 can take part in stimulus presentation and response capturing phases 114 before being authenticated for the kiosk 106. Similarly, the user 103 can take part in stimulus presentation and response capturing phases 116 before being authenticated for a particular application on the mobile device 102. In the stimulus presentation and response capturing phases 114 and 116, a stimulus (e.g., a moving target) can be presented on a respective user interface on the kiosk 106 or the mobile device 102, and real time responses (e.g., ocular responses, such as eye movements) of the user 110 or the user 103 can be tracked. In doing so, a time lock relationship can be created between specific visual events on respective user interfaces and responses that are able to be measured through visual systems on a respective device (e.g., the camera 108 or a front facing camera of the mobile device 102, respectively).

In response comparison and access decision phases 118 or 120, a liveness assessment can be performed to determine whether to grant access to a respective device. For instance, in a response comparison phase, a captured response can be compared to an expected response, to determine liveness of the user 110 or the user 103, respectively. If the user 110 or the user 103 are being actively captured, the user 110 or 103 can be expected to exhibit a certain type of response to the presented stimulus. If, as another example, a video spoof is presented to and captured by a respective camera device, eyes of a person in the video will not respond to the presented stimulus. Accordingly, the video spoof can be detected as an alternative representation of a live user, rather than an authentic video capturing of the user 110 or the user 103. If the spoof is detected, access to a respective device can be denied. If liveness of the user 110 or the user 103 is detected, based on a captured response matching an expected response, access to a respective device can be granted (e.g., with possibly other types of authentication being performed).

Liveness detection based on detecting an expected response to a presented stimulus can be a passive form of authentication. An ocular response to a stimulus can be unconscious, and can be captured without requiring explicit user input supplied by the user 110 or 103 in response to prompts. The response can be an involuntary physiological pathway based response that requires no conscious effort by the user 110 or the user 103. Reducing required user input can improve usability for the user 110 or the user 103.

Video capturing and analysis can be performed on various types of devices, without requiring advanced sensor hardware, structured light, etc. A liveness assessment utilizing stimulation onset based time-locked response parameters can be performed using any device that includes or has access to a camera, for example.

Figure 2:
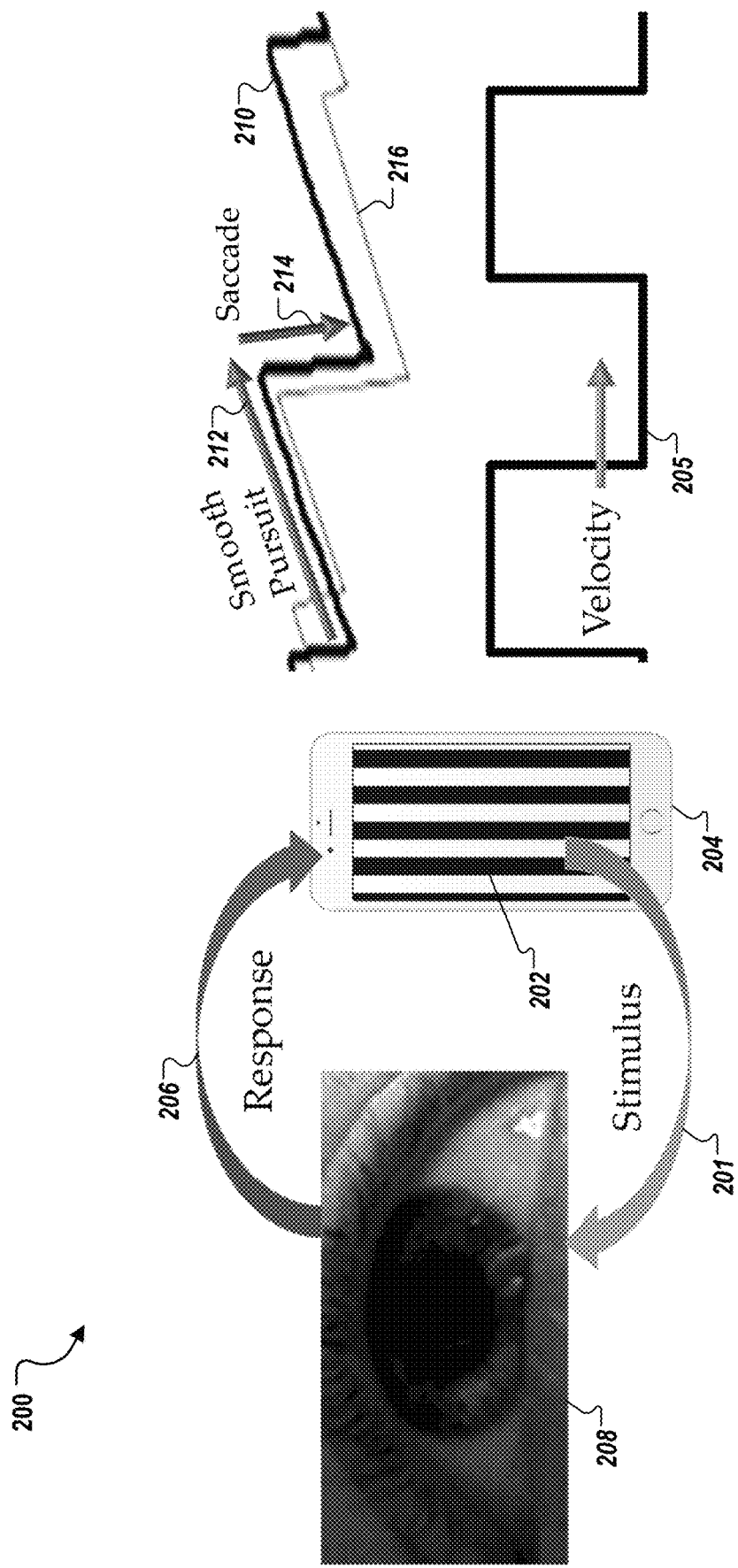
FIG. 2 illustrates a system for liveness assessment.

FIG. 2 illustrates a system 200 for liveness assessment. A stimulus 201, such as an animated high-contrast array 202, is presented on a mobile device 204. As illustrated by a graph 205, the stimulus 201 can be presented at a particular velocity, and can repeat. Parametric adjustments can allow randomization of stimulus direction (e.g., right-to-left or left-to-right animation) and magnitude, which can generate different user responses.

An observed response 206, such as eye movements of an eye 208 of a user, can be tracked. An analysis engine can determine whether the observed response 206 matches an expected response (e.g., based on standardized response models). For instance, an expected response can include, as illustrated by a graph 210, a slower phase smooth pursuit period 212 followed by a faster phase return saccade 214. A graph 216 represents the observed response 206, and in this example, the observed response 206 also includes a smooth pursuit followed by a saccade. The analysis engine can determine that the observed response 206, which, in this example, is a stimulus-induced nystagmus, matches the expected response. Accordingly, access to the mobile device 204 (e.g., a particular application on the mobile device 104) can be granted.

Figure 3:
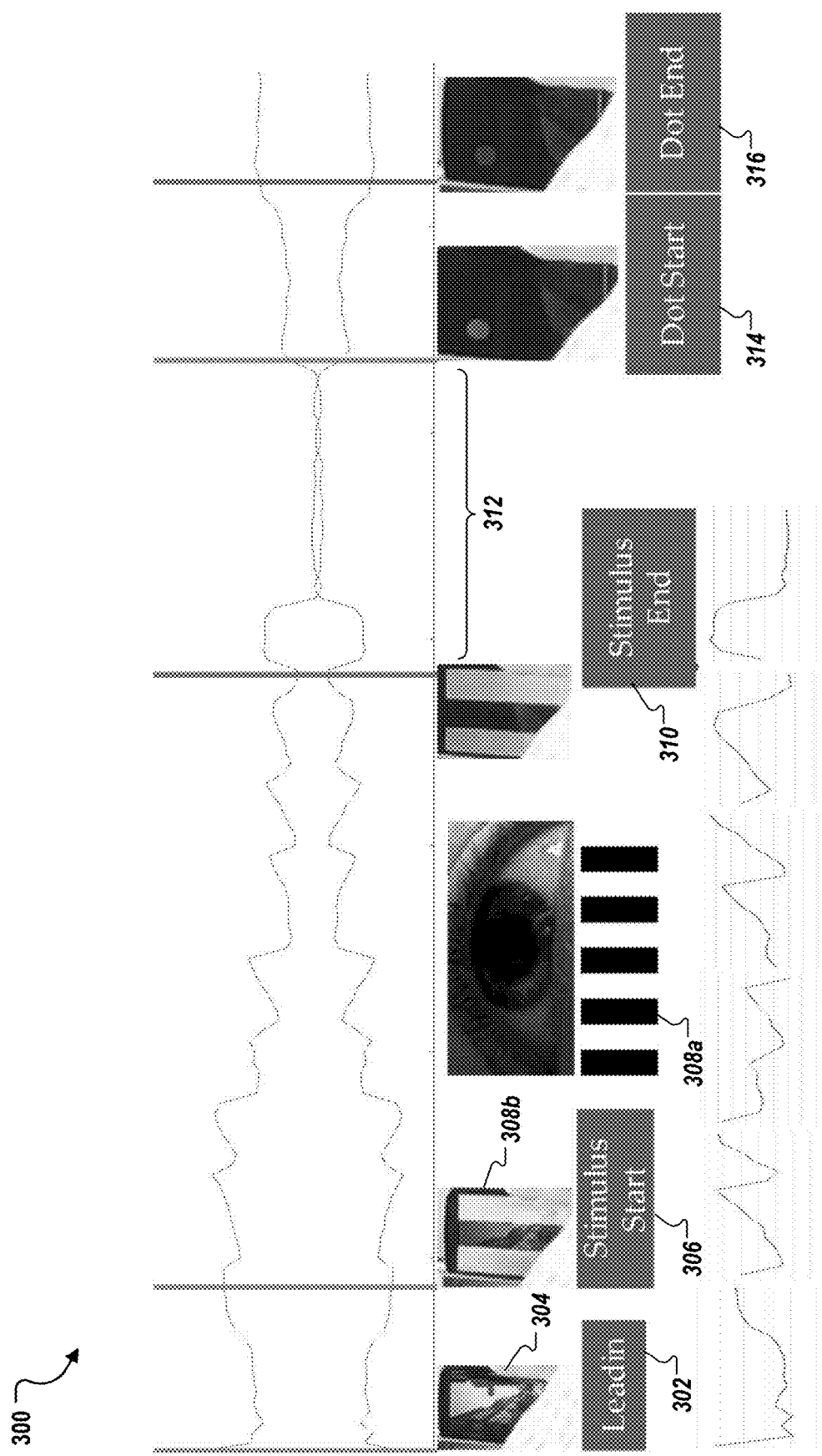
FIG. 3 illustrates a system for stimulus presentation and response gathering.

FIG. 3 illustrates a system 300 for stimulus presentation and response gathering. In a lead-in phase 302, a lead-in image 304 is optionally displayed, before stimulus onset. The lead-in image 304 can be a predetermined image, or can be a blank screen. The lead-in image can be presented, before a stimulus, to improve a stimulus-onset-based kinetic response.

A stimulus phase begins with an onset 306 of a stimulus (e.g., 308a, 308b) and stops with a stimulus ending 310. In the stimulus phase, eye movements (e.g., represented by a right eye movement graph 312 and a right eye movement graph 314) are tracked. A user may exhibit different cycles of smooth pursuits followed by saccades, for example.

In some implementations, a blank screen can be displayed in a post-stimulus phase 312. In some implementations, a re-initialization phase includes the displaying of an item (e.g., a dot) in a border area (e.g., upper corner) of a display, to reinitialize a user's focus before a next stimulus is presented (e.g., the reinitialization phase can be defined by a dot-start time point 314 and a dot-end time point 316. For instance, in some examples, multiple stimuli can be presented, and multiple, respective responses tracked. Multiple stimuli can be presented, for example, to gather multiple response samples for a user, for improved accuracy and confidence of a liveness assessment.

Figure 4:
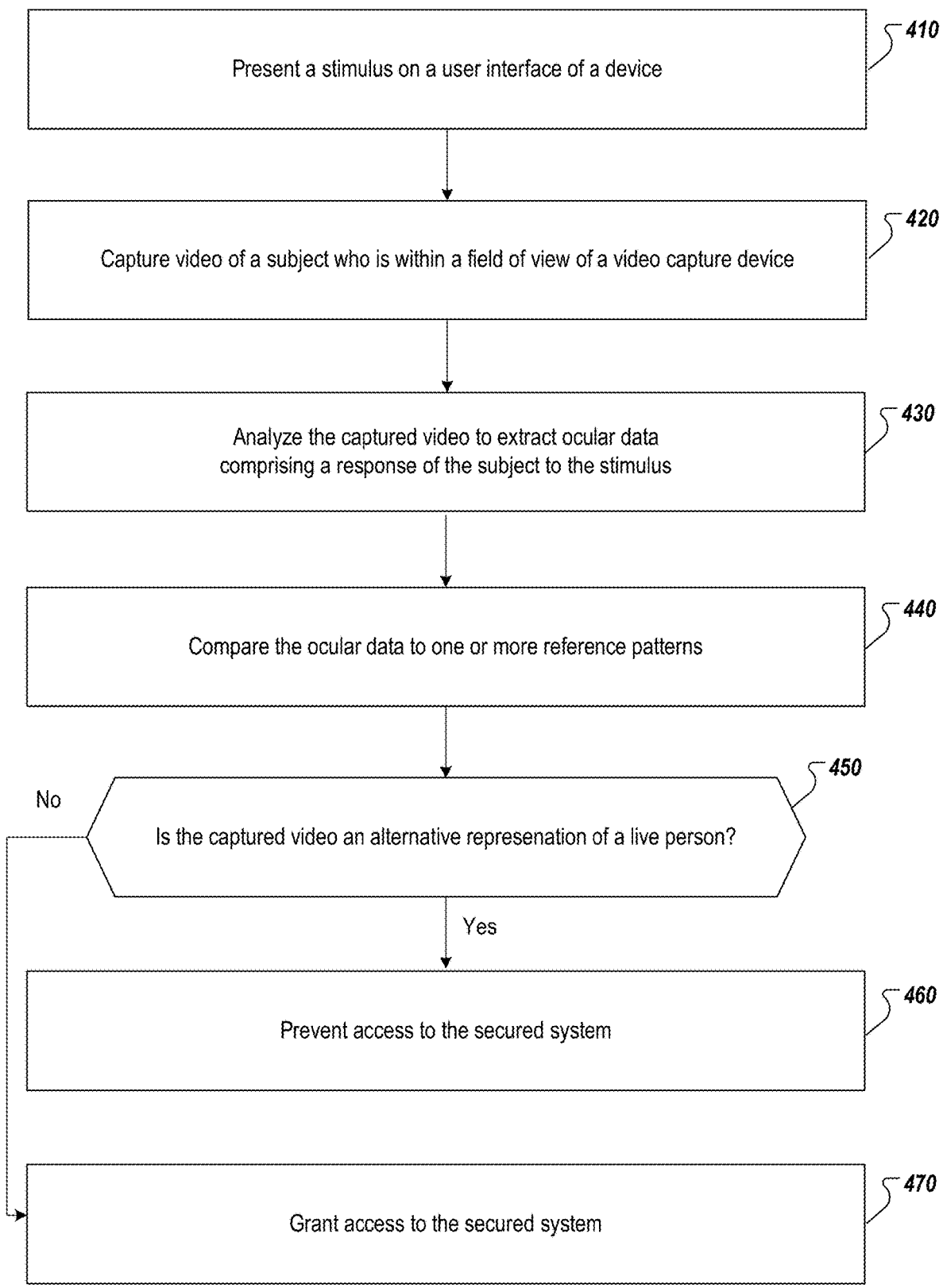
FIG. 4 is a flowchart of an example process for preventing access to a secure system based on determining a captured video to be an alternative representation of a live person.

FIG. 4 is a flowchart of an example process 400 for preventing access to a secure system based on determining a captured video to be an alternative representation of a live person. In some implementations, at least a portion of the process 400 may be executed by one or more processing devices disposed within a kiosk such as the kiosk 106, or within a mobile device such as the mobile device 102, each described with reference to FIG. 1. In some implementations, at least a portion of the process 400 may be executed by an authentication engine 605 described below with respect to FIG. 6, which may be disposed within a kiosk, within a mobile device, or at one or more servers.

Operations of the process 400 include presenting a stimulus on a user interface of a device (410). The stimuli can be presented as part of an authentication process, for example. A stimulus can be designed to trigger an intentional direction of user gaze. A stimulus can presented by playing back a pre-rendered video file, for example. As another example, the stimulus can be an animation presented by execution of programming instructions. In some implementations, presentation of the stimulus is repeated.

A stimulus can include a moving animation that includes high contrast, for example. In response to moving high-contrast stimulus, a user's eye generally follows the stimulus with a smooth pursuit, loses interest, and then returns, via a saccade, to a previous gaze location. The high contrast item can be a regular grid pattern, a regular array, such as alternating light and dark vertical bars, or some other type of approach that generates a high contrast.

Parameters of a stimulus can be determined, and used to tailor stimulus presentation. For instance, for a high contrast gratings stimulus, a visual cycle of two degrees can be selected. The high contrast gratings, with the visual cycle of two degrees, can be rendered so that, when shown full screen, occupy a field of view of e.g., ten degrees, e.g., on a mobile device. A stimulus can be designed with a consideration of ten degrees in anticipation of a particular screen size (e.g., five inches) and a particular device-to-face distance (e.g., 20-25 centimeters). A stimulus can be designed so that a visual space in a user's field of view occupied by the stimulus (e.g., assuming the particular screen size and device-to-face distance) corresponds to a primary high visual acuity region of the user's retina known as the fovea, which is the most densely populated region of the retina.

Other stimulus parameters can be selected, to improve timeliness and/or consistency of user responses. For instance, an orientation (e.g., portrait, landscape) or an animation direction can be selected. For stimuli that are presented as a wave, a sinusoidal or square wave can be selected. For some stimuli, an angle of movement can be configured. As another example, a movement of a stimulus can be set to be constant, at a particular velocity, or a movement of a stimulus can be configured to include stimulus acceleration.

A particular stimulus velocity can be configured and selected. For instance, a velocity of from one to six degrees per second can be selected. With slower velocities, achieving a consistent pattern of smooth pursuits may be problematic. With faster velocities, a greater eye motion error can occur with user return saccades, which can be problematic for detecting smooth pursuit/return saccade patterns. A particular velocity can be selected which has been determined, across a user population in general, to result in a highest degree of predictable and repeatable user responses.

Parameters can be selected, in general, to achieve maximum eye displacement in response to the stimulus. Increasing eye displacement can enable response detection at greater eye-to-screen distances. As the eye-to-screen distance increases, a relative scale of the eye (e.g., per pixel volume to a tracked region) decreases, which can make for harder response detection. Increased eye displacement can occur when a length of the smooth phase of a optokinetic nystagmus is increased. Increasing eye displacement can result in successful detection of the displacement, at larger screen-to-eye distances, lower frame rates, and lower resolutions.

In some implementations, a type of stimulus is selected from among multiple types of stimuli. A particular stimulus type can be chosen at random, for example. Other stimulus types can be stimuli that include warping, convergence, waves, looming illusions, distortion, fading, blur, color, facial image, change in illumination intensity, or other aspects.

The fovea contains more color receptors than other parts of the eye, and some aspects of motion tracking rely on fovea data. Some patterns of specific colors or textures of color for visual elements may result in larger displacement than other colors or patterns. A color or pattern that results in a larger eye displacement can be selected.

Different types of blurring approaches can be used. For instance, portions of a user interface except a selected unblurred portion can be blurred. A blurring action can move a user's focus to a desired, unblurred region. As another example, the user interface can be configured so that an unblurred portion moves across the screen. Blurring can be used as a stimulus due to a human eye and brain tendency of finding and following a less-blurry region. The brain generally decides to focus eyes on higher-information areas, for example.

As a similar example, some types of patterns have higher affinity than others, and can be selected. For instance, facial images have higher tracking affinity than other types of stimuli, and can result in user tracking even with other background elements present. Presentation of stimuli can include presenting a facial image to draw an initial user gaze, for example.

A stimuli can be configured as an obvious, separate part of an authentication process, or can be presented in a way that is seamless to a user's other interactions. In some examples, a stimuli can be dynamic repositioning of user interface elements of a standard user interface (e.g., a login screen) before user interaction with the user interface elements, rather than presentation of a separate user interface. For some applications, a stimuli type or approach can be selected based on usability or visual appearance concerns, with a goal of reducing visual jarring for the user, while still generating a detectable response.

Operations of the process 400 include capturing video of a subject who is within a field of view of a video capture device after presentation of the stimulus (420). The video capture device can be included in or otherwise associated with the device. The video capture device can, for example, process a continuous video stream using a GPGPU (General Purpose Graphics Processing Unit) camera pipeline for efficient processing. In some implementations, a camera is placed offset from the center of the device, to create angular disparities which can result in easier calculations than for lesser angular disparities that may occur with a centered camera. The video can be captured in a time period after onset of the stimulus, to collect realtime data to be used to generate classification samples. Video capture can include real-time eye tracking, for purposes of gathering ocular response information to the presented stimulus.

Operations of the process 400 include analyzing the captured video to extract ocular data comprising a response of the subject to the stimulus (430). The response is a physiological/symmetric reflexive response to the stimuli. The ocular data represents a near real time localization of basic ocular features after onset of the stimulus.

Analyzing the video can include identifying eye angles and other ocular data that occurs when the stimulus moves across the screen. In some implementations, changes in pupillary dynamics (e.g., change in pupil diameter) are tracked (e.g., which can occur due to changes in illumination intensity for some stimuli and/or when the user has been presented with a particularly interesting or provocative stimulus).

An original eye position as recorded before the stimulus was presented can be used as a reference position. Eye movement and displacement can be calculated using two and/or three-dimensional calculations. Ocular features can include a sequential derivative as a displacement velocity and acceleration. As another example, a total magnitude of displacement can be calculated as a combined vertical and horizontal motion in a total magnitude vector. Calculating eye movement and displacement can include accounting for head rotation and slope (e.g., roll and yaw). In general, eye movement tracking can account for head location, eye relationship to the head, and head/eye relationship to the screen. Eye tracking is described in more detail below with respect to FIG. 5.

Other challenges can occur when collecting ocular data and can involve specific processing. Challenges can occur, for example, from resolution issues, the stability of (or the lack of) the device, different user-to-screen distances, different room lighting, and different screen brightness levels. Ocular data tracking with respect to eye opening detection can present particular challenges, for example.

For instance, eye motion tracking can include identification and tracking of the pupil. However, insufficient (e.g., partial) eye opening can cause issues with identifying and tracking points as they relate to the ellipse of both the eye opening and the pupillary boundary. Vertical eyelid motion can manifest most visibly in terms of upper eyelid motion (e.g., relative eye closure). Tracking vertical eyelid motion can be a method to track vertical gaze components at higher distances. Challenges can occur if a user's drooping of eyelids increases over a duration of a data collection period. Increased drooping can occur, for example, due to attentional factors and/or repetitive stimulus fatigue. Gabor filter iris segmentation can be used to compensate for tracking issues emerging from eye closure. Optical flow approaches may be used (e.g., for brief periods) when only smaller segments of the iris are visible.

Blinking, while related to eye opening, can present unique challenges. A change in visual space content can trigger a blink event as a sort of "visual reset", e.g., at the start and/or end of a stimulus. Modeling which requires contiguous regions of tracking may have less tracking confidence due to blink events. Also, given that a blink event may trigger some visual motion, a blink event could override an optokinetic nystagmus reflex. For instance, due to post blink motion latency, the optokinetic nystagmus reflex may essentially be de-potentiated (e.g., a buffer may be essentially "flushed") during the blink cycle. A blink reflex can be potentiated after a high contrast visual stimulus.

As a solution to blink issues, a duration of the stimulus cycle can be reduced to avoid mixing blink events into the response signal. However, shortening stimulus periods may reduce a probability of detecting a full optokinetic nystagmus cycle, so stimulus length reduction approaches can take the response detection probability into account. As another solution, blink events may be determined to be predictable with specific stimulus velocity and cycle configurations, and accordingly, blink events can be part of expected (and observed) responses), and used for comparison. For instance, after a blink event, there is generally a period of re-acquisition of the motion signal, much the same as the first detection cycle. An expected response pattern can include both the blink event, and the reacquisition.

Specific approaches can be used to solve stability issues. Significant factors of motion can impact the recording of front facing ocular motion data, for example. In practical applications, components of motion from both a camera path and separate head movements can complicate clear separation of eye motion from frame motion. Continuity based tracking metrics (e.g., patch and feature tracking) and frame to frame optical flow estimates can be used to stabilize some aspects of the video frame motion distortion. In some implementations, distance metrics (described below) can be used for accounting for the interaction between perceived screen-space motion as it relates to displacement velocity.

Mobile device focal lengths are generally designed to generate wide fields of view with a maximum depth of field. Accordingly, mobile device cameras can have substantial distortion. During normal use cases, users generally engage with a mobile device at a range of 20-30 centimeters. In devices enabled with full high density front facing cameras, the typical device range can generate, for example, approximately a 200×130 pixel ocular region in the recorded video. Methods of fast localization and approximation of eye position can utilize a scale normalization process. Distance issues can be solved by adaptive stimulus velocity and visual scale adjustment based on a real time (e.g., frame-to-frame) viewing distance estimate. In some implementations, accounting for device motion is performed, so that a stimulus appears, from a tracking perspective, to have a same scale, position, and velocity despite motion of the device.

Ocular data collection can utilize a scale normalization method or reprojection/downsizing to fit recognition models. Such fits can vary from frame to frame, and while sufficient for template matching tasks, the fits can fail to establish a necessary "continuity" of motion flow to establish critical "smooth" motion regions. Another type of resolution in the case of time sequence is sample rate. Sample rate can be a critical factor with consideration of a possible rate of change in the eye position over a given duration. Front facing cameras can capture video at a particular frame rate (e.g., 30 frames per second), which can be different than a frame rate used by eye tracking platforms or libraries. Eye tracking platforms can use, for example, a higher frame rate (e.g., 60 frames per second or greater) for accurately tracking saccade and motion onset.

To solve scale and resolution issues, using regions of interest of reprojected locations can reduce the scale of a sample array at full scale resolution. Using an estimate at lower scale to inform an extrinsic fit at full resolution may speed up critical boundary detection (e.g., eyelid, outer iris, etc.). Since eye motions follow patterns, a model based approach can be used for pattern detection, which may allow reliable interpolation for smooth events. In some implementations, upscaling of features (such as position, acceleration and displacement) can be performed.

Operations of the process 400 include comparing the ocular data to one or more reference patterns (440). The reference patterns can include, for example, a optokinetic nystagmus pattern, an expected change in pupillary dynamics, or other types of patterns. A pattern generally corresponds to a particular stimulus. Accordingly, a reference pattern associated with the presented stimulus can be identified. Comparing the ocular data to the identified reference pattern can include comparing tracked eye movements to the optokinetic nystagmus pattern. As another example, comparing the ocular data to the identified reference pattern can include comparing tracked changes in pupillary dynamics to an expected change in pupillary dynamics. Expected (and observed) patterns may depend on the velocity of the stimulus.

Gathered ocular data can be compared to normalized data, and a degree of match can be determined. The degree of match can correspond to a confidence level that the observed ocular response matches the expected ocular response. The degree of match can indicate a liveness assessment with a degree of certainty.

As a particular example, for eye movement, a normal distribution of angles corresponding to expected optokinetic nystagmus can be identified. Gathered eye angles can be compared to the normal distribution of angles. A degree of match between the gathered angles and the normal distribution of angles can be determined In other words, the degree of match can indicate whether the observed pattern of motion matches the expected pattern of motion. For optokinetic nystagmus, the comparison may determine whether (or to what degree) the user's eye moves after a brief time window (e.g., 3-500 milliseconds) after seeing the stimulus, followed by a smooth pursuit, and concluding with a rapid saccadic return to where the eye was looking before the stimulus.

In some implementations, a series of classifiers is used. For instance, one or more neural networks can be used. In some implementations, a LSTM (Long Short-Term Memory) neural network is used.

Operations of the process 400 include determining, by comparing the ocular data to one or more reference patterns, whether the captured video is an alternative representation of a live person (450). A determination can be made whether the degree of match exceeds a predefined threshold degree of match. If the degree of match does not exceed the threshold degree of match, a determination can be made that the video is an alternative representation of a live person, rather than an actual live person (e.g., due to an absence of an expected response). The threshold degree of match can be a degree of match corresponding to a minimum confidence level that the observed ocular response matches the expected ocular response. For eye movement, a determination can be made whether the degree of match is sufficient (e.g., at or above a threshold) to indicate that the gathered eye angles represent an observed optokinetic nystagmus. In some implementations, the degree of match is one signal among other signals that can be used for a liveness assessment. A liveness assessment can be based on an aggregation of the degree of match and the other signals, for example.

Operations of the process 400 include determining, by comparing the ocular data to the one or more reference patterns, that the captured video is an alternative representation of a live person (e.g., a Yes determination at 450). Responsive to determining that the subject in the captured video is an alternative representation of a live person, access to the secured system is prevented (460).

As another example, when the captured video is not an alternative representation of a live person (e.g., the captured video is of a live person), access to the secured system can be granted (470). For instance, a second video of a second subject can be captured after presentation of the stimulus. The second video can be analyzed to extract a second set of ocular data comprising a response of the second subject to the stimulus. An authentication engine can determine, by comparing the second set of ocular data to the one or more reference patterns, that the second subject is a live person. Responsive to determining that the second subject is a live person, the authentication engine can initiate an authentication process for determining if the live person is authorized to access the secured system.

In some implementations, reference ocular data can be compared to gathered ocular data to determine whether the user is a particular user (e.g., to validate a particular user's identity). For instance, the ocular data can be compared to reference data for multiple users. A determination can be made as to whether the gathered ocular data matches a reference pattern for a particular user. If the gathered ocular data matches reference data for a particular user, access to the secured system as the particular user can be granted. If the gathered ocular data does not match any known reference data, access to the secured system as a particular user can be denied (e.g., and another type of authentication process can be performed).

Figure 5:
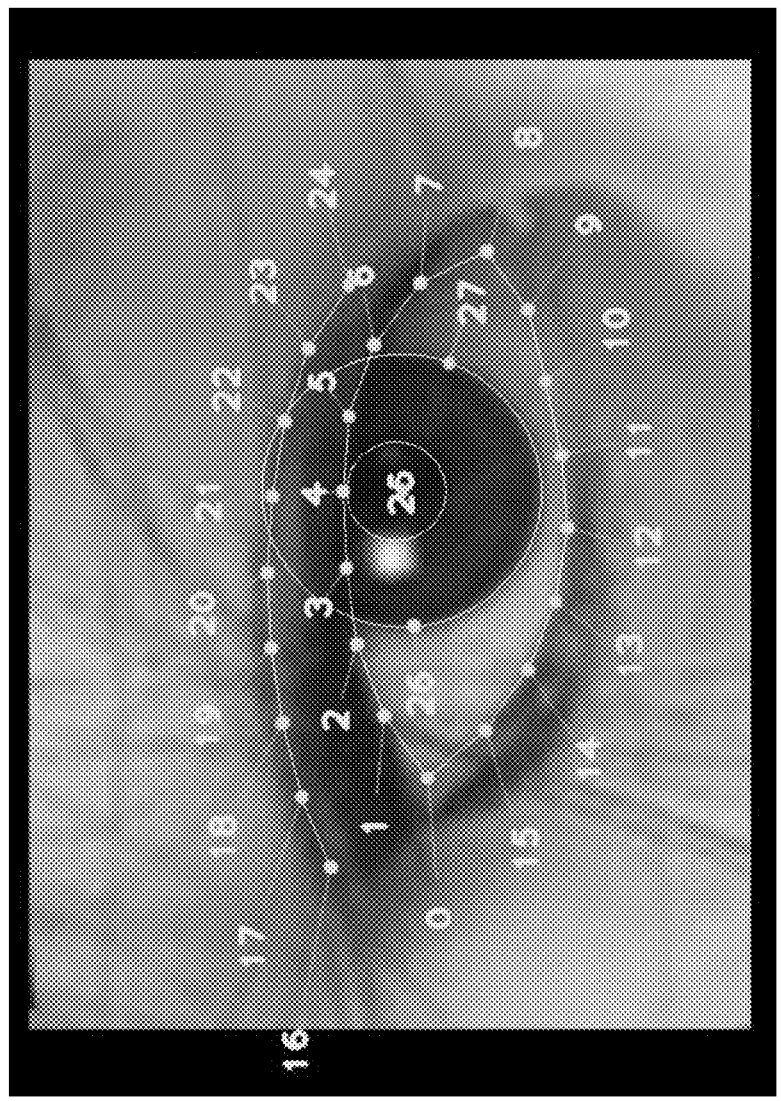
FIG. 5 illustrates eye tracking techniques.

FIG. 5 illustrates eye tracking techniques. Eye tracking can involve identifying various reference points of an eye. For instance, an annotated eye 500 includes annotations for detected eye features. Each annotation has an integer identifier (e.g., a value between one and twenty seven. For instance, annotations with identifiers between zero and fifteen correspond to detected eyelid features. Annotations with identifiers between sixteen and twenty four correspond to crease features of an eye socket. An annotation with identifier twenty five corresponds to an identified pupil center feature. An annotation with identifier twenty six corresponds to an identified sclera feature. An annotation with identifier twenty seven corresponds to an identified iris feature. The illustrated annotation scheme is a right-eye annotation scheme. A left eye annotation scheme can be generated using Y-axis mirroring.

Other tracking metrics can include identification of an outer limbus and an inner limbus (e.g., with a respective limbus intersection with a ray from an outer or inner corner to an iris center), an iris ellipse, and a pupil ellipse. Redundant limbus points can be useful since intersection points can be stable with respect to squinting and can provide an efficient anchor for posed indexed features. This can be useful since accurate point-to-ellipse distances can be non-trivial and can be computationally expensive.

Figure 6:
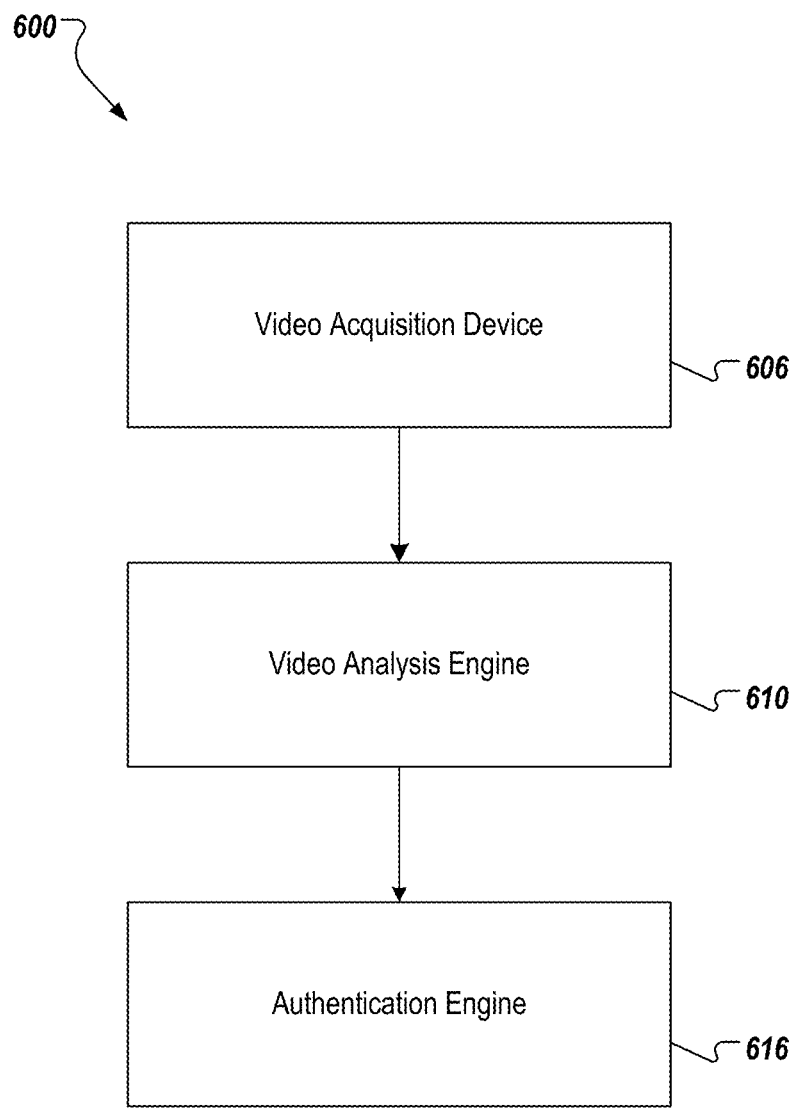
FIG. 6 shows an example system in which the technology described herein may be used.

FIG. 6 shows an example system 600 in which the technology described herein may be used. The system 600 includes a video acquisition device 605 configured to capture video recordings of subjects. The video recordings can be captured after a stimulus has been presented on a display of a device. In some implementations, the video acquisition device 605 includes an infrared camera. In some implementations, the video acquisition device 605 includes one or more processing devices configured to generate digital data from the captured video recordings.

The system 600 also includes a video analysis engine 610 that can be configured to analyze video recordings captured by the video acquisition device 605. In some implementations, the video analysis engine 610 resides on a computing device (e.g., a server) that is at a remote location with respect to the video acquisition device 605 and/or an authentication engine 615. For example, the video acquisition device 605 can be disposed at a kiosk or a mobile device that communicates over a network with a remote server on which the video analysis engine 610 executes. The video analysis engine 610 can in turn provide an output of the analysis to the authentication engine 615 residing on the kiosk or the mobile device. In some implementations, the authentication engine 615 can also reside on a remote server (e.g., the same server one which the video analysis engine 610 resides, or on a different server) and communicate the result of an authentication process to the kiosk or the mobile device.

The video analysis engine 610 can be configured to analyze the captured video recordings in various ways, in order to determine features of the captured video recordings that can be used for liveness assessment. For instance, the video analysis engine 610 can analyze the captured video to extract ocular data comprising a response of the subject to the stimulus. The video analysis engine 610 can be configured to analyze the captured video recordings in various ways, in order to determine whether or not the captured video recordings correspond to a live person. For instance, the video analysis engine 610 can comparing the ocular data to a reference pattern to determine whether the captured video is an alternative representation of a live person, based on a degree of match between the ocular data and the reference pattern.

The authentication engine 610 can prevent access to a secured system, in response to identifying the subject in the video recording to be an alternative representation of a live person. If the authentication engine 610 determines that the degree of match satisfies a threshold condition indicative of the video recording being of a live person, an authentication process for determining if the live person is authorized to access the secure system can be initiated. In other words, if the captured video recording includes sufficient ocular data indicative of an expected response of a live person, the subject in the image can be identified as a live person, and an authentication process can be initiated. The authentication engine 610 can authenticate the live person to access the secure system (e.g., a user account or privileges associated with the access attempt), and the live person can be allowed to continue an interaction with the corresponding user interface (e.g., on a kiosk or a mobile device).

Figure 7:
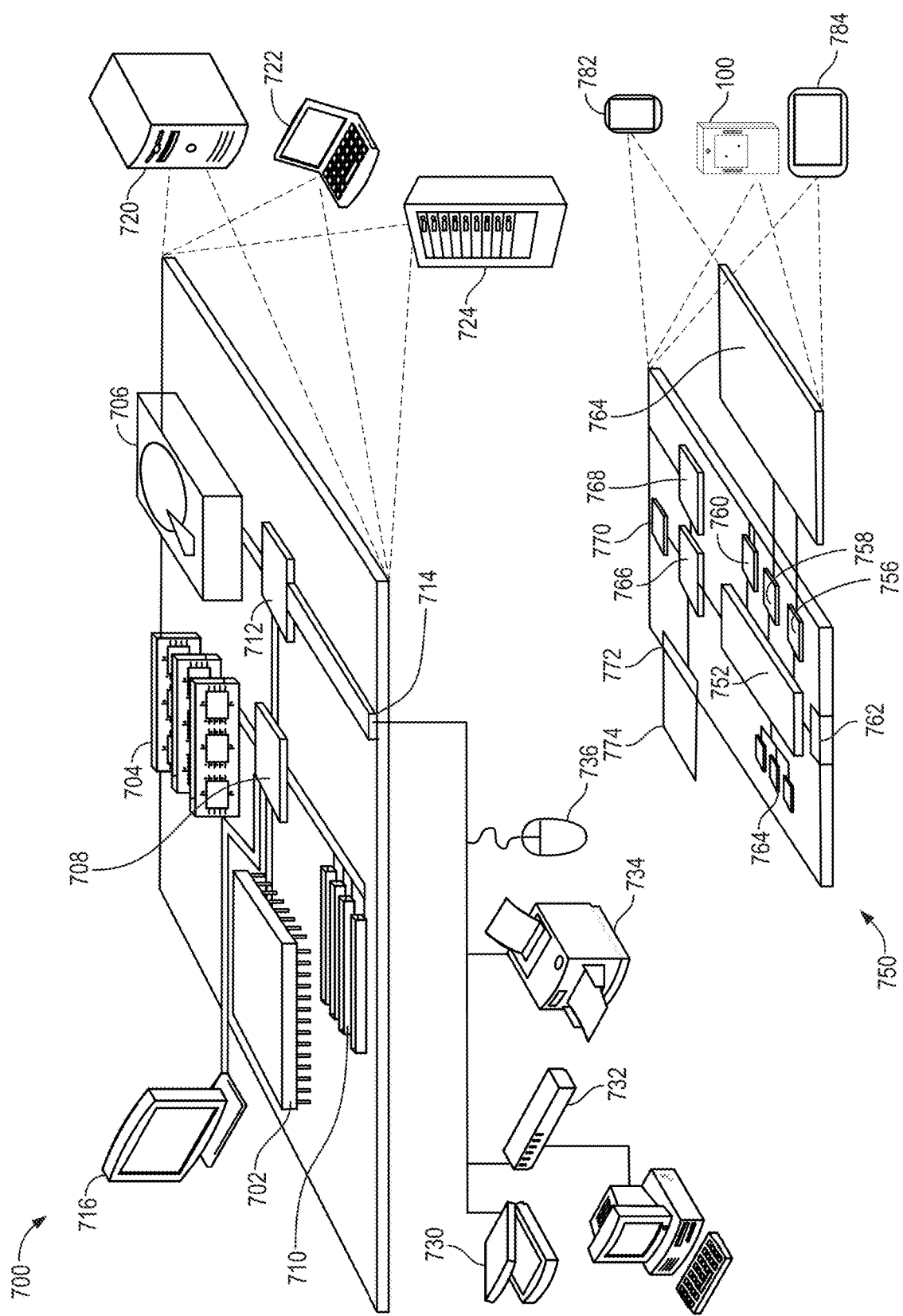
FIG. 7 is a block diagram representing examples of computing devices.

FIG. 7 shows an example of a computing device 700 and a mobile device 750, which may be used with the techniques described here. For example, referring to FIG. 1, the kiosk device 106 can include one or more of the computing device 700 or the mobile device 750, either in part or in its entirety. The mobile device 106 can be the mobile device 750, for example. The Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, and so forth) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:
1. A method for preventing access to a secure system based on determining a captured video to be an alternative representation of a live person, the method comprising:
   determining a first stimulus velocity at which to present a stimulus to a subject on a user: interface of a device, wherein the first stimulus velocity is based on a viewing distance between the subject and the user-interface being a first distance;
presenting the stimulus to the subject at the first stimulus velocity on the user-interface of the device;
determining that the viewing distance between the subject and the user-interface has changed from the first distance to a second distance;
selecting a second stimulus velocity based on the second distance;
presenting the stimulus at the second stimulus velocity on the user-interface;
capturing video of the subject while the subject is within a field of view of a video capture device after presentation of the stimulus at the second stimulus velocity;
analyzing the video to extract ocular data comprising a response of the subject to the stimulus when presented at the second stimulus velocity;
determining, by comparing the ocular data to one or more reference patterns that the subject in the captured video is an alternative representation of a live person, wherein the one or more reference patterns are selected based on the second stimulus velocity; and
responsive to determining that the subject in the captured video is an alternative representation of a live person, preventing access to a secured system.

2. The method of claim 1, further comprising:
capturing a second video of a second subject after a second presentation of the stimulus, to the second subject, at the second stimulus velocity;
analyzing the second video to extract a second set of ocular data comprising a response of the second subject to the stimulus;
determining, by comparing the second set of ocular data to the one or more reference patterns, that the second subject is a live person; and
responsive to determining that the second subject is a live person, initiating an authentication process for determining if the live person is authorized to access the secured system.

3. The method of claim 1, further comprising selecting a type of stimulus to present from among multiple types of stimulus.

4. The method of claim 1, wherein the stimulus is a high contrast stimulus.

5. The method of claim 1, wherein analyzing the captured video comprises tracking eye movements after presentation of the stimulus.

6. The method of claim 5, wherein the reference patterns include a first pattern corresponding to optokinetic nystagmus.

7. The method of claim 6, wherein comparing the ocular data comprises comparing the tracked eye movements to the first pattern corresponding to optokinetic nystagmus.

8. The method of claim 1, wherein analyzing the captured video comprises tracking changes in pupillary dynamics after presentation of the stimulus.

9. The method of claim 8, wherein the reference patterns include a second pattern corresponding to an expected change in pupillary dynamics.

10. The method of claim 9, wherein comparing the ocular data comprises comparing the tracked changed in pupillary dynamics to the second pattern corresponding to the expected change in pupillary dynamics.

11. A system comprising:
a video acquisition device configured to capture a video of a subject who is within a field of view of a video capture device;
a processing device configured to:
determine a first stimulus velocity at which to present a stimulus to a subject on a user: interface of a device, wherein the first stimulus velocity is based on a viewing distance between the subject and the user-interface being a first distance;
present the stimulus to the subject at the first stimulus velocity;
determine that the viewing distance between the subject and the user-interface has changed from the first distance to a second distance,
select a second stimulus velocity based on the second distance, and
present the stimulus at the second stimulus velocity on the user-interface; and
a video analysis engine comprising one or more processing devices, the video analysis engine configured to:
analyze video of the subject captured by the video acquisition device while the subject is within a field of view of the video capture device after presentation of the stimulus at the second stimulus velocity, to extract ocular data comprising a response of the subject to the stimulus when presented at the second stimulus velocity;
determine, by comparing the ocular data to one or more reference patterns that the subject in the captured video is an alternative representation of a live person, wherein the one or more reference patterns are selected based on the second stimulus velocity; and
responsive to determining that the subject in the captured video is an alternative representation of a live person, prevent access to a secured system.

12. The system of claim 11:
wherein the video acquisition device is configured to capture a second video of a second subject after a second presentation of the stimulus, to the second subject, at the second stimulus velocity; and
wherein the video analysis engine is configured to:
analyze the second video to extract a second set of ocular data comprising a response of the second subject to the stimulus;
determine, by comparing the second set of ocular data to the one or more reference patterns, that the second subject is a live person; and
responsive to determining that the second subject is a live person, initiate an authentication process for determining if the live person is authorized to access the secured system.

13. The system of claim 11, wherein the stimulus is a high contrast stimulus.

14. The system of claim 11, wherein analyzing the captured video comprises tracking eye movements after presentation of the stimulus.

15. One or more machine-readable non-transitory storage devices comprising machine-readable instructions configured to cause one or more processing devices to execute operations comprising:
determining a first stimulus velocity at which to present a stimulus to a subject on a user: interface of a device, wherein the first stimulus velocity is based on a viewing distance between the subject and the user-interface being a first distance;
presenting the stimulus to the subject at the first stimulus velocity on the user-interface of the device;

determining that the viewing distance between the subject and the user-interface has changed from the first distance to a second distance;
selecting a second stimulus velocity based on the second distance;
presenting the stimulus at the second stimulus velocity on the user-interface;
capturing video of the subject while the subject is within a field of view of a video capture device after presentation of the stimulus at the second stimulus velocity;
analyzing the video to extract ocular data comprising a response of the subject to the stimulus when presented at the second stimulus velocity;
determining, by comparing the ocular data to one or more reference patterns that the subject in the captured video is an alternative representation of a live person, wherein the one or more reference patterns are selected based on the second stimulus velocity; and
responsive to determining that the subject in the captured video is an alternative representation of a live person, preventing access to a secured system.

16. The machine-readable storage devices of claim 15, the operations further comprising:

capturing a second video of a second subject after a second presentation of the stimulus, to the second subject, at the second stimulus velocity;

analyzing the second video to extract a second set of ocular data comprising a response of the second subject to the stimulus;

determining, by comparing the second set of ocular data to the one or more reference patterns, that the second subject is a live person; and responsive to determining that the second subject is a live person, initiating an authentication process for determining if the live person is authorized to access the secured system.

17. The machine-readable storage devices of claim 15, the operations further comprising selecting a type of stimulus to present from among multiple types of stimulus.

* * * * *

UNITED STATES PATENT AND TRADEMARK OFFICE
CERTIFICATE OF CORRECTION

PATENT NO. : 10,599,934 B1  
APPLICATION NO. : 16/361078  
DATED : March 24, 2020  
INVENTOR(S) : Jesse Lowe, Christopher Lovelace and Reza R. Derakhshani Page 1 of 1

It is certified that error appears in the above-identified patent and that said Letters Patent is hereby corrected as shown below:

On the Title Page

Item (73), Column 1 (Assignee), Line 1, Delete "Hoding" and insert -- Holding --, therefor.

In the Claims

Column 16, Line 67, In Claim 1, delete "user: interface" and insert -- user-interface --, therefor.

Column 18, Line 7, In Claim 11, delete "user: interface" and insert -- user-interface --, therefor.

Column 18, Line 10, In Claim 11, delete "distance;" and insert -- distance, --, therefor.

Column 18, Line 12, In Claim 11, delete "velocity;" and insert -- velocity, --, therefor.

Column 18, Line 37, In Claim 12, delete "claim 11:" and insert -- claim 11, --, therefor.

Column 18, Line 62, In Claim 15, delete "user: interface" and insert -- user-interface --, therefor.

Signed and Sealed this  
Eleventh Day of August, 2020

Andrei Iancu  
*Director of the United States Patent and Trademark Office*